United States Patent [19]

Ito

[11] Patent Number: 5,817,268

[45] Date of Patent: Oct. 6, 1998

[54] METHOD OF INTEGRALLY MOLDING A WEATHER STRIP ON A PANEL EDGE

[75] Inventor: Tosikazu Ito, Obu, Japan

[73] Assignee: Tokai Kogyo Kabushiki Kaisha, Obu, Japan

[21] Appl. No.: 791,750

[22] Filed: Jan. 30, 1997

[30] Foreign Application Priority Data

Jan. 31, 1996 [JP] Japan ................................. 8-015694

[51] Int. Cl.$^6$ ................................. B28B 7/22; B28B 5/00
[52] U.S. Cl. ..................... 264/254; 264/251; 264/252
[58] Field of Search .................................. 264/252, 254, 264/251; 156/244

[56] References Cited

U.S. PATENT DOCUMENTS 5,558,828  9/1996  Yada et al. ............................... 264/252

FOREIGN PATENT DOCUMENTS 0118397  9/1984  European Pat. Off. .
0558764  9/1993  European Pat. Off. .
0585129  3/1994  European Pat. Off. .

*Primary Examiner*—Susan A. Loring
*Attorney, Agent, or Firm*—Dennison, Meserole, Pollack & Scheiner

[57] ABSTRACT

A method of manufacturing a panel unit constituted of a panel and a frame provided on the periphery of the panel. The method comprises the steps of providing a first die having a molding groove and a panel receiving space formed therein, and a second die engageable with the first die and having a molding groove formed therein, mounting the first die on the periphery of the panel, engaging the second die with the first die to form on the periphery of the panel a molding space of which the cross-sectional configuration corresponds to that of the frame, extruding molding material into the molding space, and applying relative motion between the second die and the first die to move the second die along the first die, thereby integrally forming the frame on the periphery of the panel.

5 Claims, 10 Drawing Sheets

METHOD OF INTEGRALLY MOLDING A WEATHER STRIP ON A PANEL EDGE

BACKGROUND OF THE INVENTION

1. Field of the Invention

The present invention relates to a method of manufacturing a panel with a frame (which will be hereinafter referred to as a panel unit).

2. Description of the Prior Art

Conventionally, a frame such as a molding and a gasket is extrusion molded on the periphery of a panel such as a windshield glass of a vehicle, thereby forming a panel unit. A method of manufacturing such a panel unit is shown, for example, in Japanese Laid-Open Patent Publication No. 4-261822.

In the above-noted conventional method of manufacturing the panel unit, the frame as extruded may have a longitudinally substantially uniform cross-sectional configuration and not have a longitudinally different or modified cross-sectional configuration. In other words, the cross-sectional configuration of the frame cannot be longitudinally changed during formation of the frame.

Another method of manufacturing the panel unit is shown, for example, in Japanese Laid-Open Patent Publication No. 6-71722.

As shown in FIG. 20, this method of manufacturing the panel unit employs a molding die constituted of a die body 221 and a slider 225. The molding die is provided with a molding space 223 through which molding material is extruded to form a frame 203. As will be appreciated, the molding space 223 is formed between the die body 221 and the slider 225. The slider 225 is movably received in a guide groove 222 formed in the die body 221, so that the configuration of the molding space 223 may be preferably changed, thereby changing the cross-sectional configuration of the frame 203.

In this method, the cross-sectional configuration of the frame 203 can be longitudinally changed during formation of the frame 203. However, the slider 225 must be exactly controlled to change the cross-sectional configuration of the frame 203. Additionally, during molding operation, the molding die is heated over the melting point of the molding material. Thus, the molding die is forced to be repeatedly heated and cooled many times in a long period of time. This may generate distortion between the die body 221 and the slider 225. Such distortion may prevent normal smooth motion of the slider 225, thereby increasing difficulty in reliably controlling the slider 225 to obtain the frame 203 having a predetermined cross-sectional configuration.

SUMMARY OF THE INVENTION

It is, accordingly, an object of the present invention to provide a method of manufacturing a panel unit in which a frame having a predetermined cross-sectional configuration can be easily formed on the periphery of a panel.

In order to attain the object, the present invention provides a method of manufacturing a panel unit constituted of a panel and a frame provided on the periphery of the panel. The method comprises the steps of providing a first die having a molding groove and a panel receiving space formed therein, and a second die engageable with the first die and having a molding groove formed therein, mounting the first die on the periphery of the panel, engaging the second die with the first die to form on the periphery of the panel a molding space of which the cross-sectional configuration corresponds to that of the frame, extruding molding material into the molding space, and applying relative motion between the second die and the first die to move the second die along the first die, thereby integrally forming the frame on the periphery of the panel.

The method permits formation of the panel unit in which the frame formed on the periphery of the panel has a predetermined cross-sectional configuration.

The frame may include a plurality of sections each having a different cross-sectional configuration. To form such a frame, the configuration of the molding groove of the first die may be continuously changed so that the cross-sectional configuration of the molding space conforms to that of each section of the frame.

The first die and the second die may have guide means so that the second die smoothly and reliably travels along the first die.

Further, the first die may be constituted of a pair of die halves. In such a case, the molding groove and the panel receiving space may be formed between the die halves.

Other objects and features of the invention will be more fully understood from the following detailed description and appended claims when taken with the accompanying drawings.

DETAILED DESCRIPTION OF THE PREFERRED EMBODIMENT

Preferred embodiments of the invention will now be described in detail with reference to the drawings.

A method of manufacturing a panel unit according to a first embodiment will now be described with reference to FIGS. 1 to 14. In this embodiment, the panel unit is constructed as a front windshield glass with a molding for a vehicle.

Figure 4:
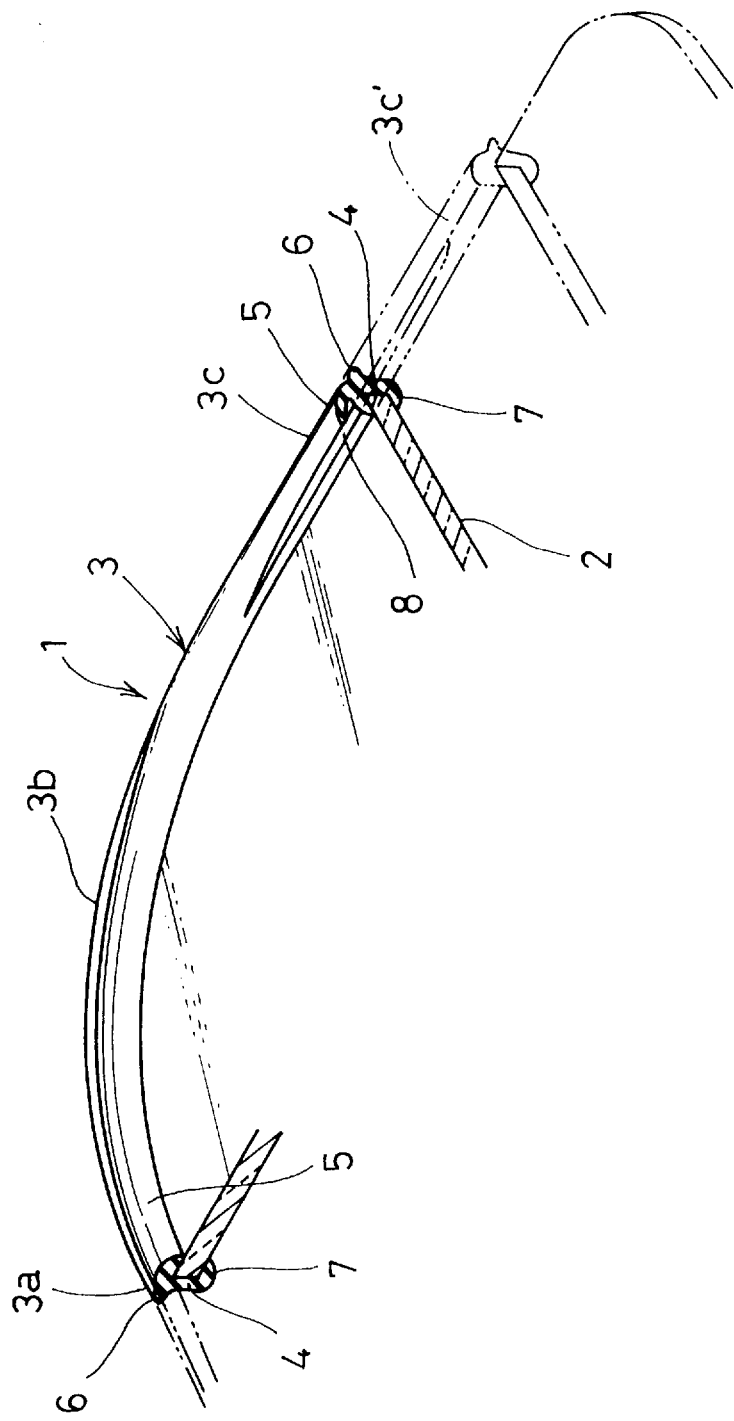
FIG. 4 is a fragmentary perspective view of a part of a panel unit manufactured in the method according to the first embodiment.
Figure 5:
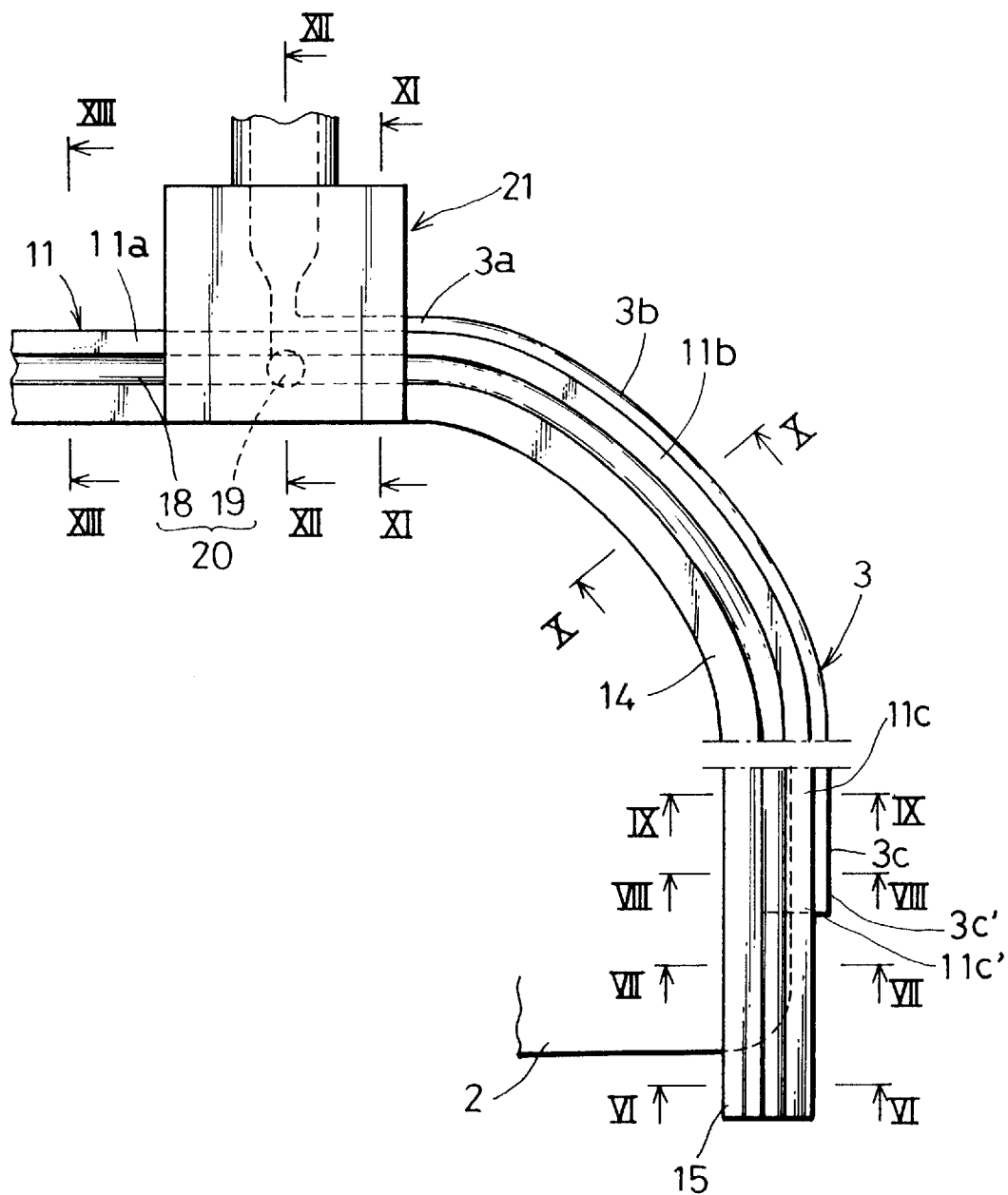
FIG. 5 is a plan view of the molding die, a windshield glass and a molding during formation of the molding on the periphery of the windshield glass.

Referring to FIG. 4, shown therein and generally designated by the reference number 1 is the panel unit adapted to be fitted in a front opening of a vehicle body (not shown). The panel unit 1 is constituted of the windshield glass 2 as a panel, and a molding 3 as a frame fixed to the periphery of the windshield glass 2.

The molding 3 is formed as an elongated single piece and includes a leg portion 4 extending along the end surface of the windshield glass 2, a lip 6 contacting a vehicle body (not shown), a cover strip 5 contacting the outer surface (upper surface as viewed in the drawing) of the windshield glass 2, and a support strip 7 engaging the inner surface of the windshield glass 2.

Further, the molding 3 includes an upper section 3a, corner sections 3b (one of which is shown), and side sections 3c (one of which is shown) corresponding to an upper edge portion, corner edge portions and side edge portions of the windshield glass 2, respectively. It is to be noted that each side section 3c has a cross-sectional configuration different from that of the upper section 3a. That is, in each side section 3c except for the lower end 3c', the cover strip 5 is split to form a rainwater drainage groove 8 therealong. As will be easily understood, the corner section 3b has different cross-sectional configurations at both ends in order to act as a transient section for continuously interconnecting the upper section 3a and the side sections 3c.

Apparatus used in the method according to this embodiment will now be described with reference to FIGS. 1 to 3 and 5 to 13.

Figure 1:
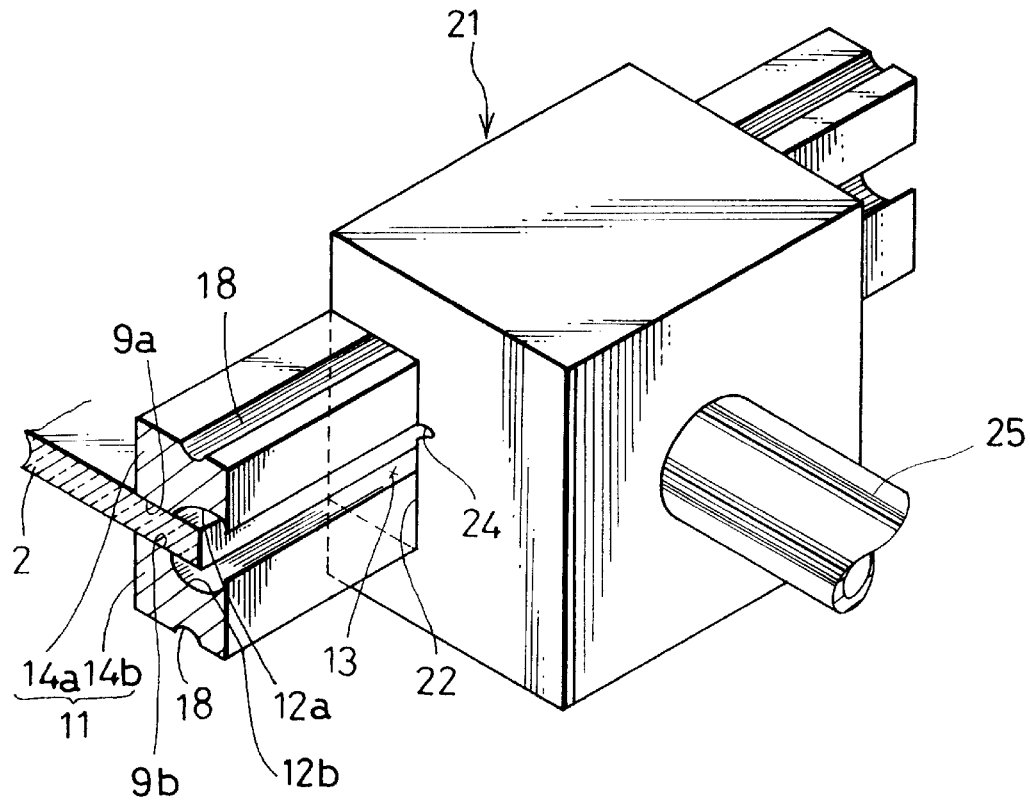
FIG. 1 is a perspective view of a molding die used in a method according to a first embodiment of the present invention.
Figure 2:
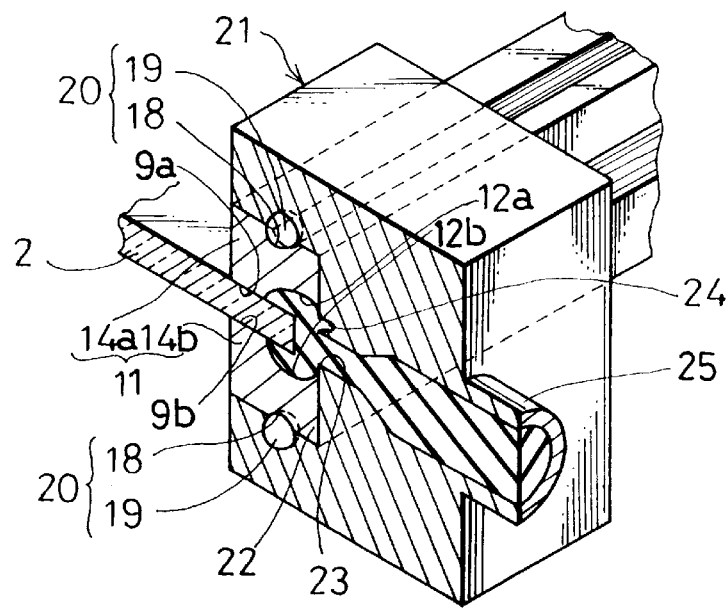
FIG. 2 is a perspective view in section of the molding die.
Figure 3:
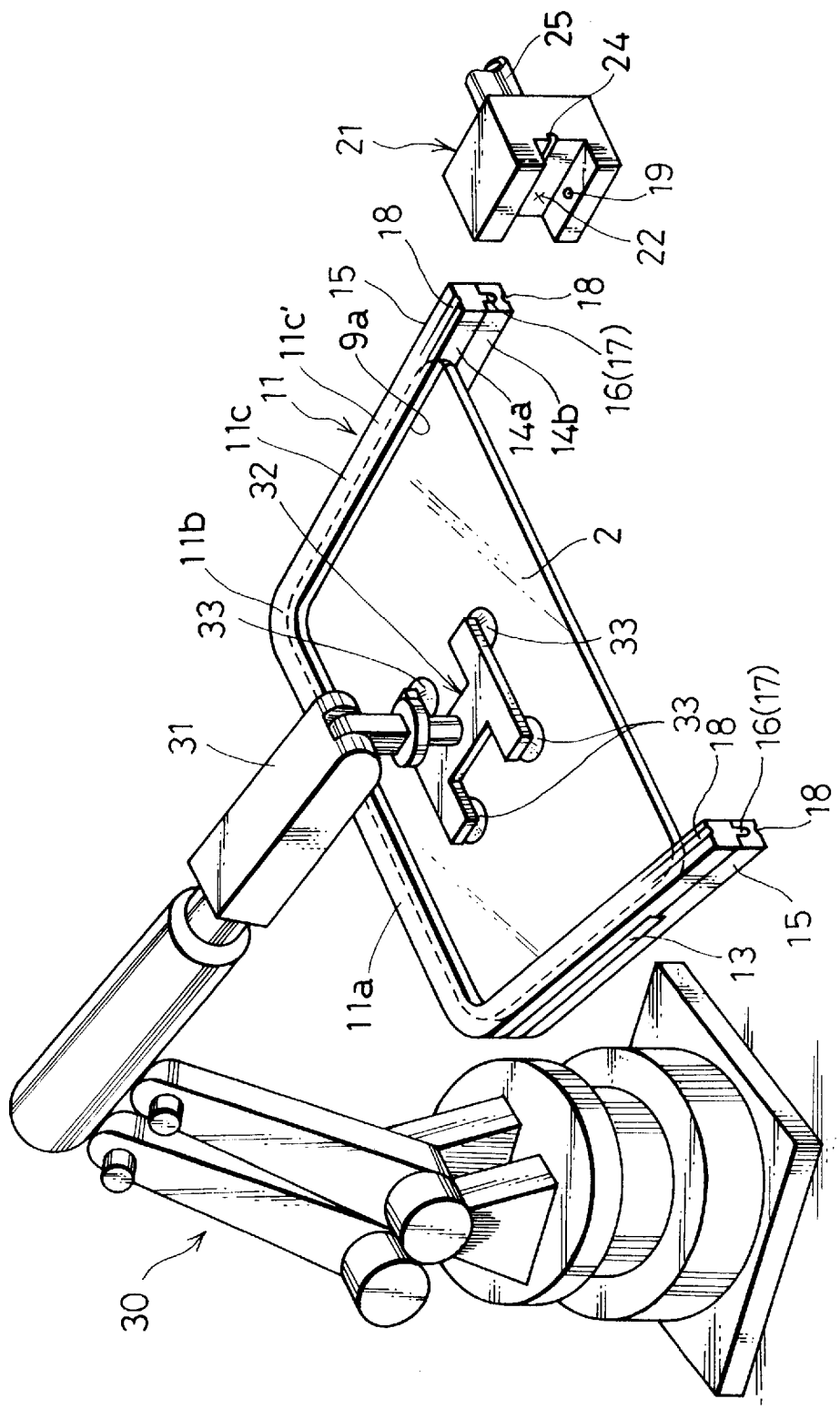
FIG. 3 is a perspective view of apparatus including the molding die.

As best shown in FIG. 3, the apparatus includes a molding die which is constituted of a frame-like die or first die 11 to be removably mounted on the upper edge portion, the corner edge portions and the side edge portions of the windshield glass 2, and a second die 21 to be moved along the first die 11 and connected to an extruder (not shown) through a feeder pipe 25. As best shown in FIGS. 1 to 3, the first die 11 is constituted of a pair of die halves 14a and 14b. The die halves 14a and 14b are provided with windshield glass contacting surfaces 9a and 9b which extend along the substantially entire length thereof and which cooperate to form a windshield glass receiving space therebetween when the die halves 14a and 14b are combined. Further, the die halves 14a and 14b are provided with molding grooves 12a and 12b therein, respectively. As will be recognized, the molding grooves 12a and 12b extend along the windshield glass contacting surfaces 9a and 9b, respectively.

On the other hand, the second die 21 is provided with an engagement channel 22 to be engaged with the first die 11 and a molding groove 24 opening in the engagement channel 22. As will be recognized, the molding groove 24 has a cross-sectional configuration which conforms to that of the lip 6 of the molding 3.

As shown in FIG. 1, when the first die 11 is mounted on the periphery of the windshield glass 2, that is, the die halves 14a and 14b are combined with the windshield glass 2 received in the windshield glass receiving space formed between the windshield glass contacting surfaces 9a and 9b, and then the second die 21 is engaged with the first die 11, the molding grooves 12a and 12b cooperate with the molding groove 24 to form a molding space 13 around the periphery of the windshield glass 2.

Further, as shown in FIG. 2, the second die 21 includes an extrusion port 23 opening in the engagement channel 22 and communicating with the feeder pipe 25 so that molding material from the extruder is fed into the molding space 13.

As shown in FIGS. 1 and 2, each of the die halves 14a and 14b of the first die 11 is formed with guide groove 18 extending over the entire length thereof. On the other hand, the second die 21 is provided with a pair of roller balls 19 which partially project into the engagement channel 22 (FIG. 2). As will be easily understood, the guide grooves 18 and the roller balls 19 cooperate to act as a guide device 20 for the second die 21, that is, each roller ball 19 is adapted to be snugly and rotatably received in the guide groove 18 so that the second die 21 smoothly and reliably moves along the first die 11.

Figure 6:
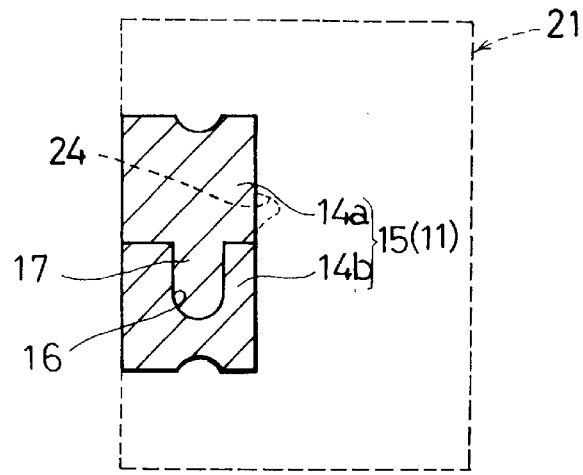
FIG. 6 is a sectional view taken along line VI—VI of FIG. 5.

Additionally, as shown in FIG. 3, the first die 11 has extensions 15 which are dimensioned to project from the lower edge of the windshield glass 2 when the first die 11 is mounted on the periphery of the windshield glass 2. In each extension 15, the die halves 14a and 14b are formed with a tenon-like projection 16 and a mortise-like channel 17 removably engageable with the projection 16, respectively, so as to be easily combined and recombined (FIG. 6).

Figure 7:
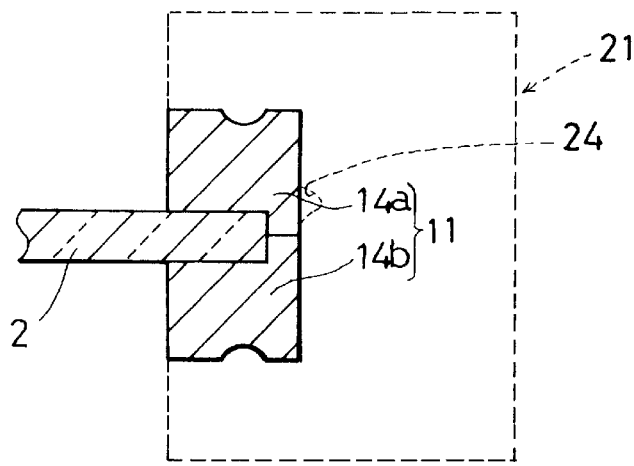
FIG. 7 is a sectional view taken along line VII—VII of FIG. 5.
Figure 8:
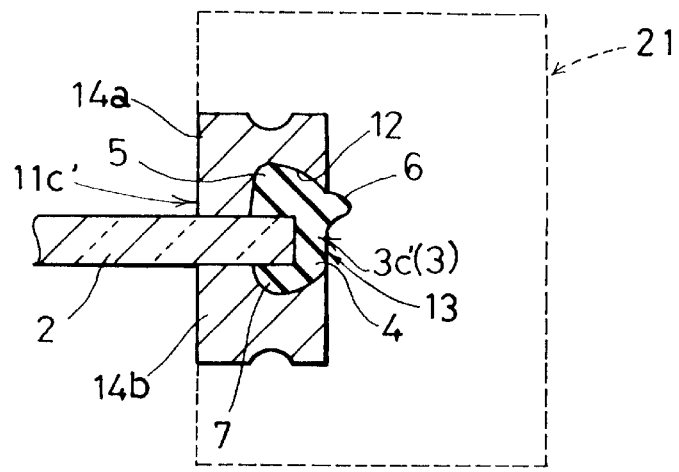
FIG. 8 is a sectional view taken along line VIII—VIII of FIG. 5.
Figure 9:
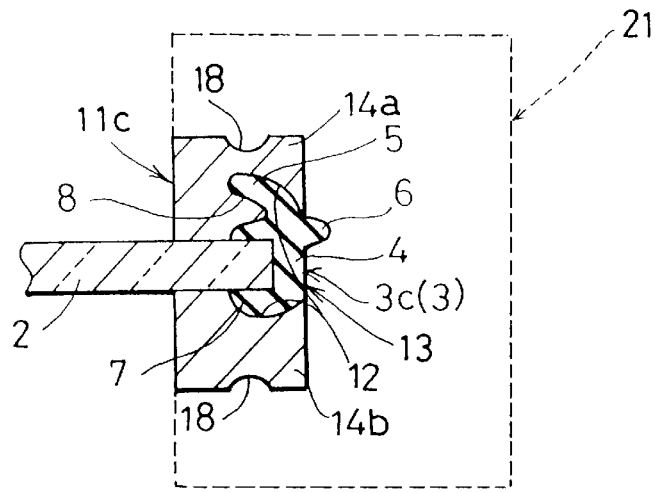
FIG. 9 is a sectional view taken along line IX—IX of FIG. 5.
Figure 10:
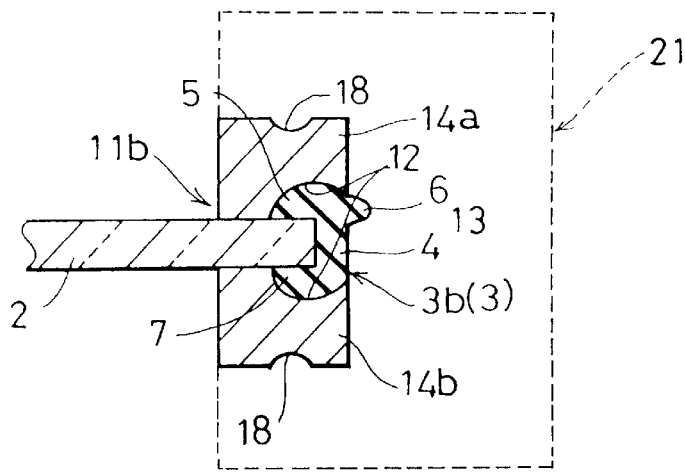
FIG. 10 is a sectional view taken along line X—X of FIG. 5.
Figure 11:
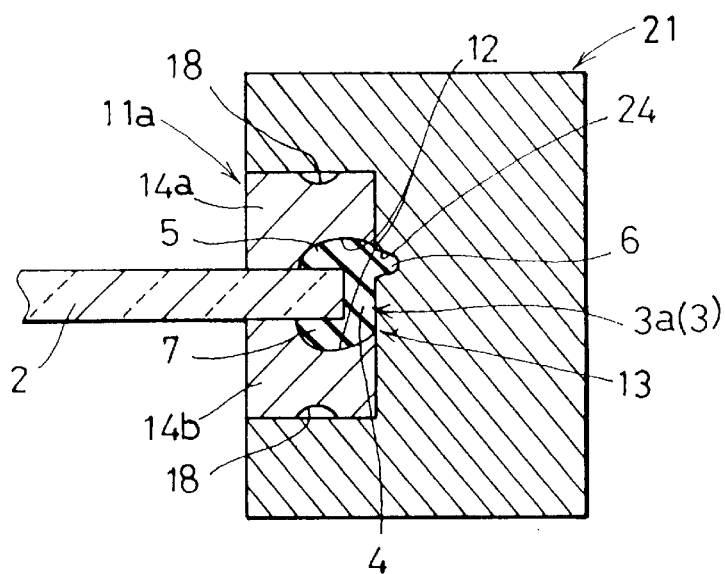
FIG. 11 is a sectional view taken along line XI—XI of FIG. 5.
Figure 12:
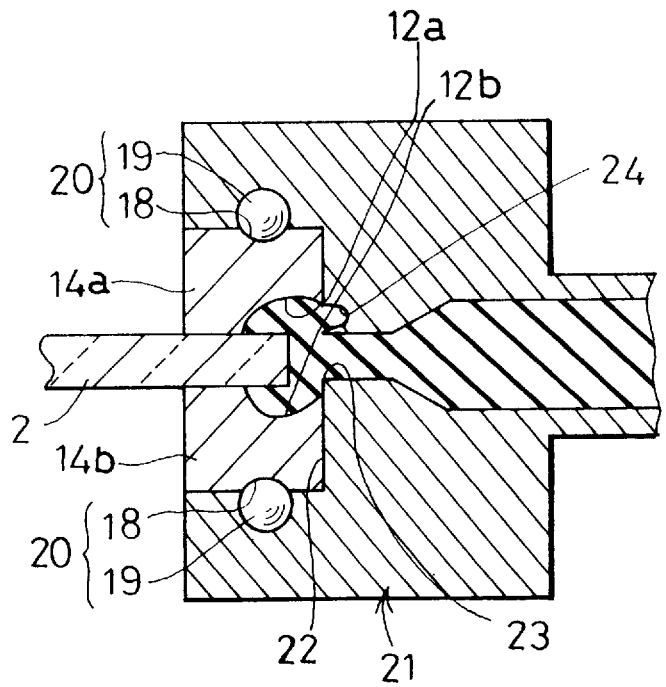
FIG. 12 is a sectional view taken along line XII—XII of FIG. 5.
Figure 13:
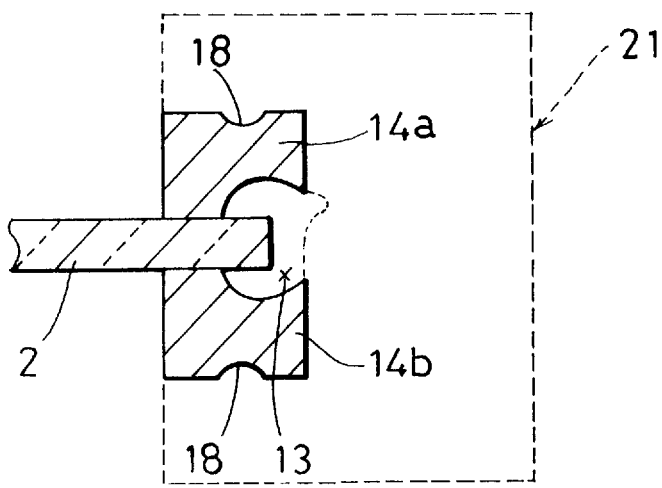
FIG. 13 is a sectional view taken along line XIII—XIII of FIG. 5.
Figure 14:
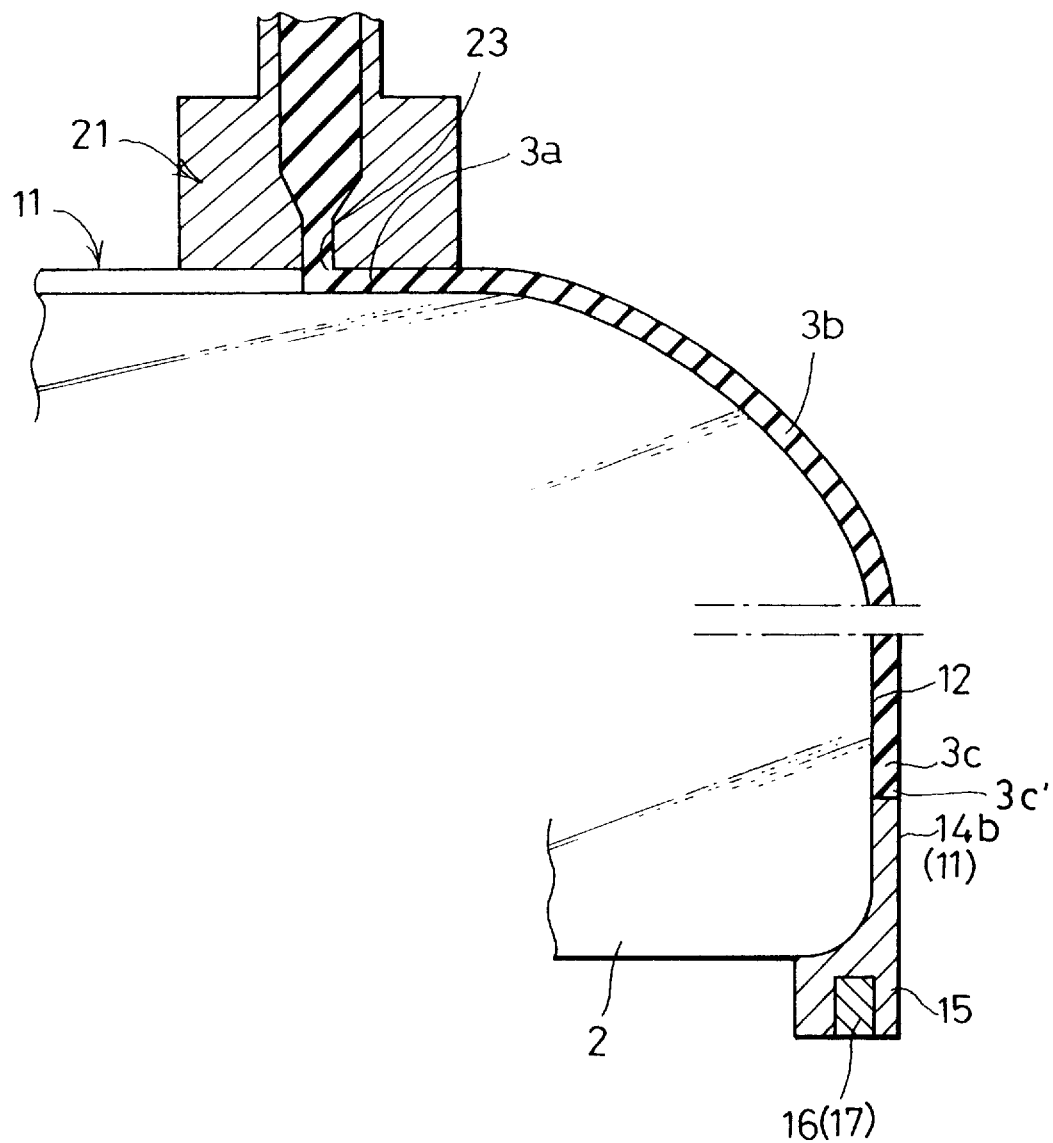
FIG. 14 is a transverse sectional view of FIG. 5.
Figure 15:
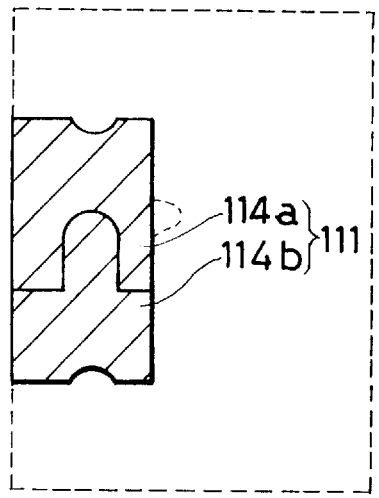
FIG. 15 is a sectional view similar to FIG. 6, illustrating a molding die used in a method according to a second embodiment.
Figure 16:
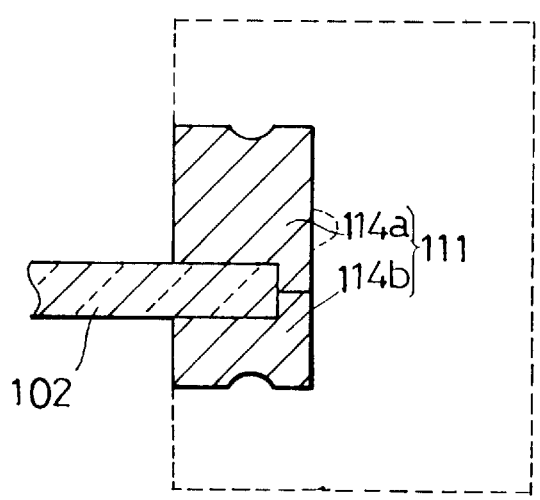
FIG. 16 is a sectional view similar to FIG. 7, illustrating the molding die used in the method according to the second embodiment.
Figure 17:
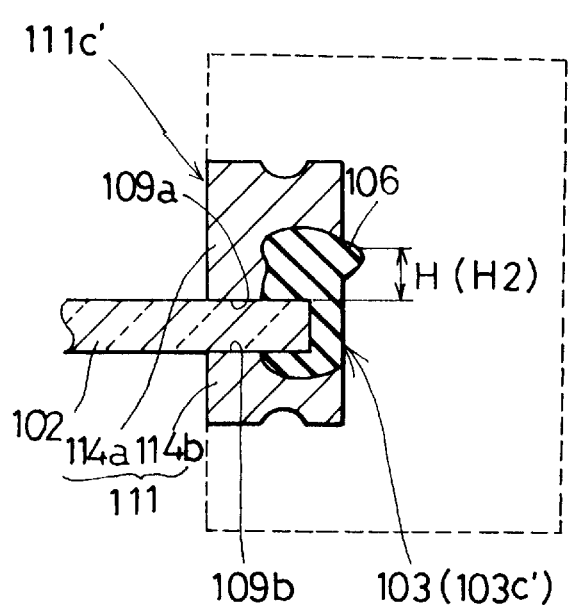
FIG. 17 is a sectional view similar to FIG. 8, illustrating the molding die used in the method according to the second embodiment.
Figure 18:
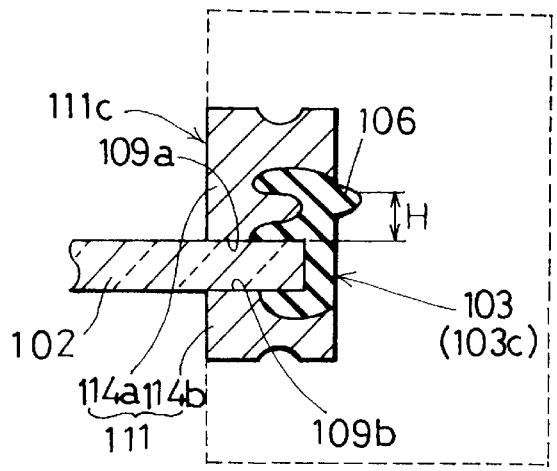
FIG. 18 is a sectional view similar to FIG. 9, illustrating the molding die used in the method according to the second embodiment.
Figure 19:
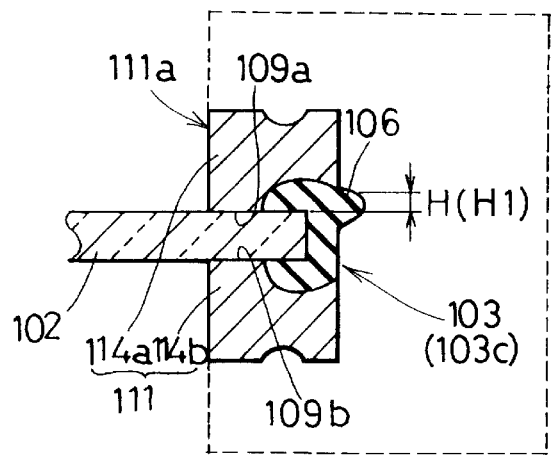
FIG. 19 is a sectional view similar to FIG. 10, illustrating the molding die used in the method according to the second embodiment.
Figure 20:
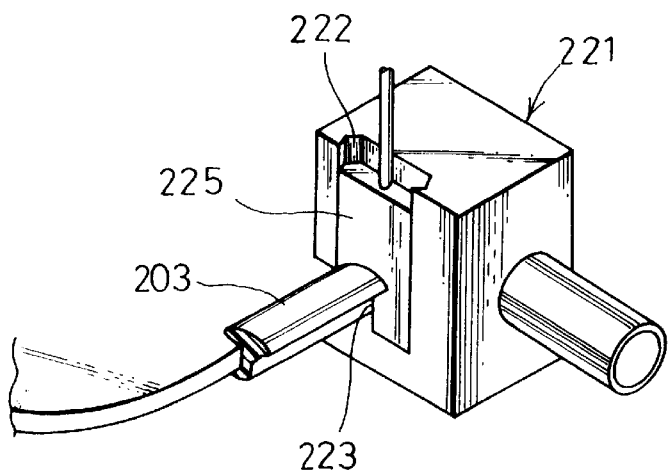
FIG. 20 is a perspective view of a molding die used in a conventional method.

It is to be noted that the configuration of the molding grooves 12a and 12b is continuously changed so that the cross-sectional configuration of the molding space 13 conforms to that of the molding 3 to be extruded on the periphery of the windshield glass 2. As shown in FIG. 9, in a side section 11c of the first die 11, the molding grooves 12a and 12b are shaped so that the cross-sectional configuration of the molding space 13 conforms to that of the side section 3c of the molding 3. As shown in FIG. 10, in a corner section 11b of the first die 11, the molding grooves 12a and 12b are shaped so that the cross-sectional configuration of the molding space 13 conforms to that of the corner section 3b of the molding 3. As shown in FIG. 11, in an upper section 11a of the first die 11, the molding grooves 12a and 12b are shaped so that the cross-sectional configuration of the molding space 13 conforms to that of the upper section 3a of the molding 3. Further, as shown in FIG. 8, in the lower portion 11c' of the side section 11c of the first die 11, the molding grooves 12a and 12b are shaped so that the cross-sectional configuration of the molding space 13 conforms to that of the lower end 3c' of the side section 3c of the molding 3. As will be appreciated, the molding grooves 12a and 12b terminate in the lower portion 11c' of the side section 11c, that is, as shown in FIG. 7, in a section between the lower portion 11c' of the side section 11c and the extension 15 of the first die 11, the die halves 14a and 14b are preferably grooved to closely receive the periphery of the windshield glass 2.

As shown in FIG. 3, the apparatus further includes a robot 30 for handling the windshield glass 2. The robot 30 is of a six-axes type, and includes a support arm 31 and a panel retainer unit 32 mounted on the distal end of the support arm 31. The panel retainer unit 32 has desired numbers (shown as four in number for illustration purposes) of sucking disks 33 for releasably retaining the windshield glass 2. The sucking disks 33 are coupled to a vacuum source (not shown). When the vacuum source is energized, the sucking disks 33 stick to the windshield glass 2 so that the windshield glass 2 is retained on the panel retainer unit 32.

The process of manufacturing the panel unit 1 will now be described in connection with the operation of the apparatus.

The die halves 14a and 14b are arranged along the periphery of the windshield glass 2 and then are combined by engaging the projections 16 with the channels 17. Thus, the first die 11 is mounted on the periphery of the windshield glass 2 in such a way that the upper section 11a, the corner sections 11b and the side sections 11c thereof correspond to the upper edge portion, the corner edge portions and the side edge portions of the windshield glass 2, respectively.

Thereafter, the vacuum source coupled to the robot 30 is energized, and then the robot 30 is driven so that the windshield glass 2 is retained on the panel retainer unit 32. The robot 30 is further driven to move the panel retainer unit 32 retaining the windshield glass 2 so that the engagement channel 22 of the second die 21 engages one of the extensions 15 of the first die 11, with the roller balls 19 received in the guide grooves 18.

The robot 30 is further driven by a signal corresponding to a predetermined operational program to continuously move the windshield glass 2 in such a manner that the second die 21 moves along the first die 11 toward the other of the extensions 15. Simultaneously, the extruder is actuated to feed the molding material into the second die 21 through the feeder pipe 25. As will be appreciated, when the second die 21 reaches the lower portion 11c' of the side section 11c of the first die 11, the molding material fed from the extruder is extruded into the molding space 13. Thus, when travel of the second die 21 is completed, the molding 3 having the side sections 3c, the corner sections 3b and the upper section 3a is continuously formed on the periphery of the windshield glass 2.

After that, the robot 30 is further driven to move the panel retainer unit 32 so as to disengage the second die 21 from the other of the extensions 15 of the first die 11. Thereafter, the die halves 14a and 14b are removed from the periphery of the windshield glass 2 by disengaging the projections 16 from the channels 17, thereby obtaining the panel unit 1 as shown in FIG. 4.

Now, it is important to constantly form the molding 3 which has no variation in quality and which has desired dimension of cross-sectional configurations at the upper section 3a, the corner sections 3b and the side sections 3c. For this purpose, extrusion rates of the extruder or relative speeds between the first die 11 and the second die 21 are suitably controlled so that the molding material is controlled to be extruded in proper amounts for respective sections 3a, 3b and 3c.

According to this embodiment, the molding 3 may have a predetermined cross-sectional configuration since it is extremely reliably formed on the periphery of the windshield glass 2 by cooperation of the first die 11 and the second die 21.

Referring now to FIGS. 15 to 19, shown therein is a second embodiment of the invention. This embodiment is a modification of the first embodiment. Therefore, only the construction which is different from that in the first embodiment will be explained.

Like the first embodiment, a first die 111 is constituted of a pair of die halves 114a and 114b. The die halves 114a and 114b are provided with windshield glass contacting surfaces 109a and 109b which extend along the substantially entire length thereof and which cooperate to form a windshield glass receiving space therebetween when the die halves 114a and 114b are combined. However, unlike the first embodiment, the windshield glass contacting surfaces 109a and 109b corresponding to side sections 111c of the first die 111 are gradually inclined in such a way that the thickness of the die half 114a corresponding to each side section 111c of the first die 111 is gradually reduced toward an upper section 111a of the first die 111 and that the thickness of the die half 114b corresponding to each side section 111c of the first die 111 is gradually increased toward the upper section 111a of the first die 111.

According to this embodiment, like the first embodiment, a molding 103 is continuously formed on the periphery of a windshield glass 102. However, unlike the first embodiment, in each side section 103c of the molding 103, a distance H between a surface of the windshield glass 102 and a lip 106 is gradually changed depending on the inclination angle of the windshield glass contacting surface 109a and 109b, so that an upper section 103a of the molding 103 has a minimum distance H1 and that a lower end 103c' of each side section 103c has a maximum distance H2.

Although the above preferred embodiments employ the front windshield glass for a vehicle as the panel and the molding as the frame, the panel and the frame in the present invention are not limited to the above. For instance, the panel may be a rear windshield glass or a side window glass for a vehicle, or a resin or metal panel for construction material. On the other hand, the frame may be a dam rubber, a gasket or a packing.

Further, although in the above embodiments, the molding is formed on the periphery of the windshield glass so as to cover all of the upper surface, the lower surface and the end surface of the windshield glass, the molding may be formed on the periphery of the windshield glass so as to cover only one or two surfaces of the windshield glass. Additionally, the molding may have a uniform cross-sectional configuration over the entire length thereof.

Moreover, the first die may be of a non-separable single piece part, if necessary.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A method of manufacturing a panel unit constituted of a panel and a frame provided on the periphery of the panel, comprising the steps of:

providing a first elongated die having a molding groove and a panel receiving space formed therein, and a second die engageable with said first die and having a molding groove formed therein;

mounting said first die on the periphery of the panel;

engaging said second die with said first die to form on the periphery of the panel a molding space of which the predetermined cross-sectional configuration corresponds to that of the frame;

extruding molding material into said molding space; and applying relative motion between said second die and said first die to move said second die along said first die, thereby integrally forming the frame on the periphery of the panel.

2. The method as defined in claim 1, wherein the frame includes a plurality of sections each having a different predetermined cross-sectional configuration, and wherein the configuration of said molding groove of said first die is continuously changed so that the cross-sectional configuration of said molding space is changed corresponding to that of each section of the frame.

3. The method as defined in claim 1, wherein said first die and said second die have guide means so that said second die smoothly and reliably travels along said first die.

4. The method as defined in claim 1, wherein said first die is constituted of a pair of die halves.

5. The method as defined in claim 4, wherein said molding groove and said panel receiving space are formed between said die halves.

* * * * *